(12) United States Patent
Kim et al.

(10) Patent No.: US 9,425,866 B2
(45) Date of Patent: Aug. 23, 2016

(54) METHOD AND APPARATUS FOR RECEIVING COUPLED SIGNAL OF TERRESTRIAL SIGNAL AND MOBILE SIGNAL

(75) Inventors: Sung-Hoon Kim, Daejeon (KR); Jooyoung Lee, Daejeon (KR); Jin Soo Choi, Daejeon (KR); Jin Woong Kim, Daejoen (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/124,572

(22) PCT Filed: Jun. 7, 2012

(86) PCT No.: PCT/KR2012/004458
§ 371 (c)(1),
(2), (4) Date: Sep. 4, 2014

(87) PCT Pub. No.: WO2012/169776
PCT Pub. Date: Dec. 13, 2012

(65) Prior Publication Data
US 2015/0180553 A1    Jun. 25, 2015

(30) Foreign Application Priority Data
Jun. 7, 2011    (KR) .......................... 10-2011-0054449

(51) Int. Cl.
*H03H 7/30* (2006.01)
*H04N 7/04* (2006.01)
(Continued)

(52) U.S. Cl.
CPC ............ *H04B 7/005* (2013.01); *H04L 25/0206* (2013.01); *H04L 25/0212* (2013.01); *H04L 25/0228* (2013.01); *H04L 25/03019* (2013.01); *H04L 27/2602* (2013.01)

(58) Field of Classification Search
CPC ........ H04L 5/003; H04L 5/0048; H04L 43/50; H04L 5/0037; H04L 27/2649; H04L 1/0026
USPC .................................................. 375/233, 340
See application file for complete search history.

(56) References Cited

U.S. PATENT DOCUMENTS 4,571,733 A * 2/1986 Kaku ................ H04L 25/03133
                                                          333/18
5,561,468 A * 10/1996 Bryan ..................... H04L 7/041
                                                          348/469

(Continued)

FOREIGN PATENT DOCUMENTS

| JP | 2006295793 A | 10/2006 |
| KR | 1020100098215 A | 9/2010 |
| WO | 2005125024 A2 | 12/2005 |

*Primary Examiner* — Chieh M Fan
*Assistant Examiner* — Sarah Hassan
(74) *Attorney, Agent, or Firm* — William Park & Associates Ltd.

(57) ABSTRACT

A receiving apparatus estimates a transmission channel of a signal through a training signal that is inserted into a data area of a received multipath signal, i.e., a mobile signal and a terrestrial signal that is coupled to the mobile signal, and estimates a transmission channel by detecting a received mobile signal using a previously equalized signal of a mobile signal and a transmitting signal corresponding to a terrestrial signal that is coupled to the mobile signal through determined data. Mobile signal data corresponding to training signal distortion existing in terrestrial signal data are compensated based on a channel estimation value.

4 Claims, 10 Drawing Sheets

(51) Int. Cl.
*H04J 3/24* (2006.01)
*H04B 7/005* (2006.01)
*H04L 27/26* (2006.01)
*H04L 25/02* (2006.01)
*H04L 25/03* (2006.01)

(56) References Cited

U.S. PATENT DOCUMENTS

| | | | |
|---|---|---|---|
| 6,263,016 B1* | 7/2001 | Bellenger | H04L 5/1438 370/231 |
| 7,349,469 B1* | 3/2008 | Touzni | H04L 25/03063 375/232 |
| 2002/0150155 A1* | 10/2002 | Florentin | H03H 21/0012 375/233 |
| 2006/0078072 A1* | 4/2006 | Cheon | H04L 27/066 375/326 |
| 2007/0092032 A1* | 4/2007 | Yu | H03M 13/253 375/295 |
| 2009/0103657 A1* | 4/2009 | Park | H04L 1/0041 375/340 |
| 2010/0208748 A1* | 8/2010 | Hur | H04L 27/2602 370/474 |
| 2010/0220779 A1 | 9/2010 | Kwon et al. | |
| 2011/0242428 A1* | 10/2011 | Blouin et al. | 348/726 |

* cited by examiner

METHOD AND APPARATUS FOR RECEIVING COUPLED SIGNAL OF TERRESTRIAL SIGNAL AND MOBILE SIGNAL

TECHNICAL FIELD

The present invention relates to a method and apparatus for receiving a coupled signal of a terrestrial signal and a mobile signal. More particularly, the present invention relates to a method and apparatus for receiving a coupled signal of a terrestrial signal and a mobile signal that can improve receiving performance of a terrestrial signal that is weak in a multipath in an environment in which a terrestrial broadcasting signal and a mobile broadcasting signal are coupled.

BACKGROUND ART

A terrestrial broadcasting signal and a mobile broadcasting signal that are transmitted from a transmission terminal pass through a multipath channel and arrive at a receiving terminal. In this case, a multipath signal having arrived at the receiving terminal arrives at the receiving side through two or more different paths and thus a phenomenon in which intensity thereof spatially and temporally changes occurs.

Particularly, in a multipath signal, a sequential change of a multipath frequently occurs by a Doppler effect at a downtown area at which buildings are closely located or indoors, and thus in order to secure adaptability according to a time change, a mobile receiver that receives a mobile broadcasting signal is designed to more strongly stand against a time change by a Doppler effect than that of a fixed receiver that receives a terrestrial broadcasting signal. However, there is a problem that a fixed receiver that is produced in consideration of a fixed environment is weak in a multipath environment, i.e., fading and ghost environments, which are actual environments, compared with a mobile receiver.

Nowadays, in order to compensate a terrestrial signal that is weak in a multipath environment, technology that loads and transmits a terrestrial signal in a mobile signal has been developed.

As described above, in order to receive a signal that loads and transmits a terrestrial signal in a mobile signal, two independent receivers that respectively receive the mobile signal and the terrestrial signal are necessary.

However, when two independent receivers are provided, there is a problem that design of the receivers is complicated and the receivers are embodied at a high cost.

Therefore, in an environment in which a terrestrial signal and a mobile signal are coupled and transmitted, a coupled signal receiver that has excellent receiving performance for each signal and that can be cheaply embodied in a simple structure is requested.

DISCLOSURE

Technical Problem

The present invention has been made in an effort to provide a method and apparatus for receiving a coupled signal of a terrestrial signal and a mobile signal having advantages of being capable of receiving and processing two signals in an environment in which a terrestrial signal and a mobile signal are coupled and transmitted.

The present invention has been made in an effort to further provide a method and apparatus for receiving a coupled signal of a terrestrial signal and a mobile signal having advantages of enhancing receiving performance of a terrestrial signal using equalization performance of a mobile receiver in an environment in which a terrestrial signal and a mobile signal are coupled and transmitted.

Technical Solution

An exemplary embodiment of the present invention provides a receiving apparatus of a coupled signal of a terrestrial signal and a mobile signal, the receiving apparatus including: an antenna that receives a mobile signal and a terrestrial signal that are transmitted with one channel; a tuner that selects a desired frequency of the received signal by tuning and that converts the received signal to an intermediate frequency signal; an analog to digital converter (A/D converter) that converts the intermediate frequency signal that is converted in the tuner to a digital signal; a demodulation unit that demodulates and outputs the digital signal that is output from the A/D converter; and an equalization processor that estimates a transmission channel by detecting a training signal of the mobile signal and the terrestrial signal from an output signal of the demodulation unit and that compensates distortion existing in mobile signal data and terrestrial signal data.

The equalization processor may include a channel estimation unit that estimates a transmission channel of a mobile signal or a terrestrial signal through a training signal that is inserted into a data area of a received multipath signal that is the mobile signal and the terrestrial signal coupled to the mobile signal, and that estimates the transmission channel by detecting a received mobile signal using a previously equalized signal through determined data and a transmitting signal corresponding to a terrestrial signal that is coupled to the mobile signal, and an adaptive filter that receives an input of a channel estimation value of the channel estimation unit and that compensates distortion existing in mobile signal data and terrestrial signal data corresponding to the training signal.

The equalization processor may include a first equalization processor and a second equalization processor.

The first equalization processor may include a channel estimation unit that estimates a transmission channel of the terrestrial signal through a training signal that is inserted into a data area of a terrestrial signal from an output signal of the demodulation unit and that estimates a transmission channel by detecting a transmitting signal corresponding to a received terrestrial signal using a previously equalized signal through determined data, and an adaptive filter that compensates distortion existing in the terrestrial signal data using a channel estimation value of the channel estimation unit and a channel estimation value of a mobile signal that is input in the second equalization processor.

The second equalization processor may include a channel estimation unit that estimates a transmission channel of a mobile signal through a training signal that is inserted into a data area of the mobile signal from an output signal of the demodulation unit and that estimates a transmission channel by detecting a transmitting signal corresponding to a received mobile signal using a previously equalized signal through determined data, and that transfers the channel estimation value to the first equalization processor and an adaptive filter that compensates distortion existing in the mobile signal data using the channel estimation value.

The first equalization processor of the equalization processor may include a channel estimation unit that estimates a transmission channel of the terrestrial signal through a training signal that is inserted into a data area of a terrestrial signal in an output signal of the demodulation unit and that estimates a transmission channel by detecting a transmitting signal corresponding to a received terrestrial signal using a previously equalized signal through determined data, and an adaptive filter that receives an input of a channel estimation value of the channel estimation unit and that compensates distortion existing in the terrestrial signal data.

The second equalization processor may include a channel estimation unit that estimates a transmission channel of a mobile signal through a training signal that is inserted into a data area of the mobile signal from a signal that is output from the first equalization processor and that estimates a transmission channel by detecting a transmitting signal corresponding to a received terrestrial signal using a previously equalized signal through determined data, and an adaptive filter that receives an input of a channel estimation value of the channel estimation unit and that compensates distortion existing in the mobile signal data.

Another embodiment of the present invention provides a method of receiving a coupled signal of a terrestrial signal and a mobile signal, the method including: selecting a desired frequency of the mobile signal and the terrestrial signal that are received with one channel by tuning of a tuner and converting the received signal to an intermediate frequency signal; converting, by an A/D converter, the intermediate frequency signal to a digital signal; demodulating the digital signal through a demodulation unit; estimating, by an channel estimation unit of an equalization processor, a transmission channel of a mobile signal and a terrestrial signal through a training signal that is inserted into a data area of the mobile signal and the terrestrial signal that is coupled to the mobile signal, and estimating a transmission channel by detecting a received mobile signal using a previously equalized signal through determined data and a transmitting signal corresponding to a terrestrial signal that is coupled to the mobile signal; and receiving an input of the channel estimation value and compensating distortion existing in mobile signal data and terrestrial signal data corresponding to the training signal through an adaptive filter of an equalization processor.

Advantageous Effects

In a method and apparatus for receiving a coupled signal of a terrestrial signal and a mobile signal according to an exemplary embodiment of the present invention, when the terrestrial signal and the mobile signal are coupled and transmitted, a receiver that receives two signals can be inexpensively embodied in a simple structure.

Further, in a method and apparatus for receiving a coupled signal of a terrestrial signal and a mobile signal according to an exemplary embodiment of the present invention, in an environment in which the terrestrial signal and the mobile signal are coupled and transmitted, receiving performance of a fixed receiver can be enhanced using equalization performance of a mobile receiver.

In a method and apparatus for receiving a coupled signal of a terrestrial signal and a mobile signal according to an exemplary embodiment of the present invention, when the apparatus is formed to transmit and receive and process a left image signal and a right image signal to correspond to the terrestrial signal and the mobile signal, respectively, a three-dimensional image can be very effectively embodied.

That is, in a method and apparatus for receiving a coupled signal of a terrestrial signal and a mobile signal according to an exemplary embodiment of the present invention, a three-dimensional image as well as a two-dimensional image can be received and output through one receiver.

MODE FOR INVENTION

Figure 1:
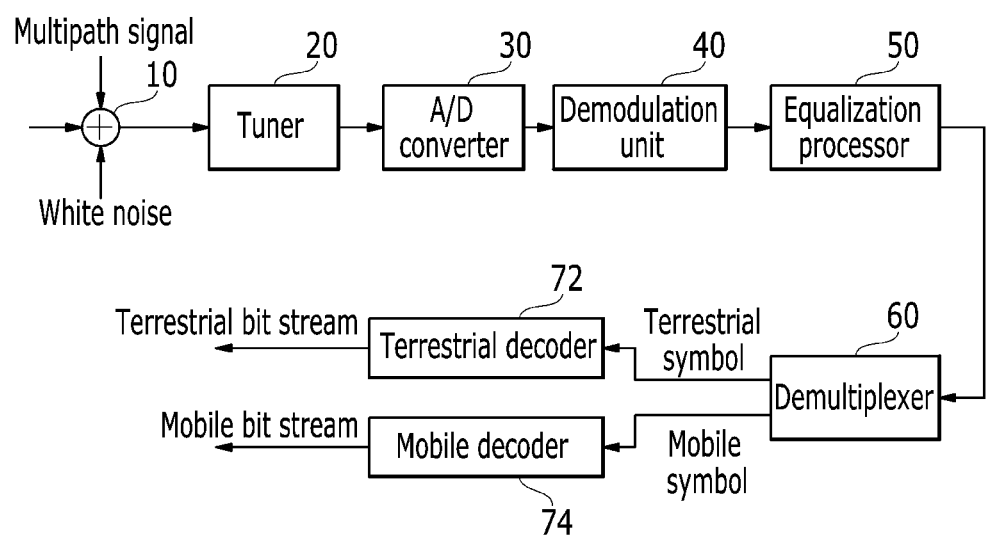
FIG. 1 is a block diagram illustrating a configuration of a receiving apparatus of a coupled signal of a terrestrial signal and a mobile signal according to a first exemplary embodiment of the present invention.

Hereinafter, a method and apparatus for receiving a coupled signal of a terrestrial signal and a mobile signal according to an exemplary embodiment of the present invention will be described in detail with reference to the accompanying drawings.

The drawings and description are to be regarded as illustrative in nature and not restrictive. Like reference numerals designate like elements throughout the specification. Further, a repeated detailed description of constituent elements will be omitted.

In the entire specification, unless explicitly described to the contrary, the word "comprise" and variations such as "comprises" or "comprising" will be understood to imply the inclusion of stated elements but not the exclusion of any other elements.

FIG. 1 is a block diagram illustrating a configuration of a receiving apparatus of a coupled signal of a terrestrial signal and a mobile signal according to a first exemplary embodiment of the present invention.

As shown in FIG. 1, the receiving apparatus of a coupled signal of a terrestrial signal and a mobile signal according to a first exemplary embodiment of the present invention includes an antenna 10, a tuner 20, an analog to digital converter (A/D converter) 30, a demodulation unit 40, and an equalization processor 50.

The antenna 10 receives a coupled signal of a mobile signal and a terrestrial signal that are transmitted with one channel.

The coupled signal that is transmitted with the one channel is received in the antenna 10 as a multipath signal.

White noise, etc., may be introduced into the antenna 10.

The tuner 20 selects a desired frequency of the signal that is received through the antenna 10 by tuning, and converts the received signal into an intermediate frequency signal.

The A/D converter 30 converts the intermediate frequency signal that is converted in the tuner 20 to a digital signal.

The demodulation unit 40 demodulates and outputs a digital signal that is output from the A/D converter 30.

In the foregoing description, the antenna 10, the tuner 20, the A/D converter 30, and the demodulation unit 40 may be generally applied to a configuration of a receiver that receives and processes a broadcasting signal such as a mobile signal or a terrestrial signal, and therefore a detailed description thereof will be omitted.

Figure 2:
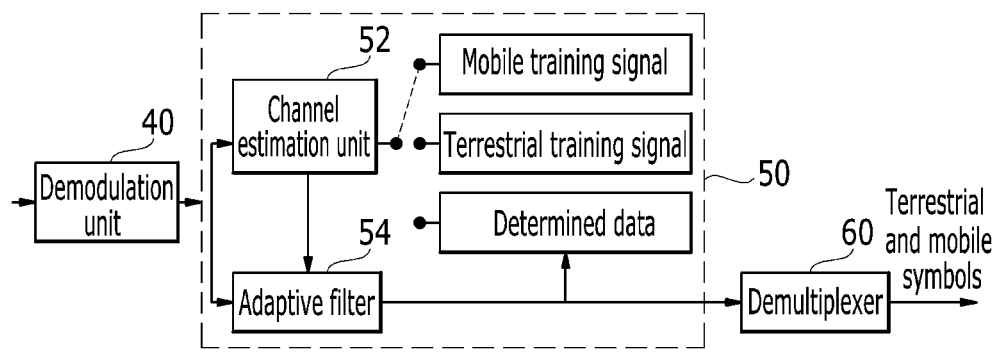
FIG. 2 is a block diagram illustrating a configuration of an equalization processor in a receiving apparatus of a coupled signal of a terrestrial signal and a mobile signal according to a first exemplary embodiment of the present invention.

FIG. 2 is a block diagram illustrating a configuration of an equalization processor in a receiving apparatus of a coupled signal of a terrestrial signal and a mobile signal according to a first exemplary embodiment of the present invention.

As shown in FIGS. 1 and 2, the equalization processor 50 detects a training signal from an output signal of the demodulation unit 40, estimates a transmission channel, and compensates distortion existing with mobile signal data and terrestrial signal data through an adaptive filter 54.

Figure 3:
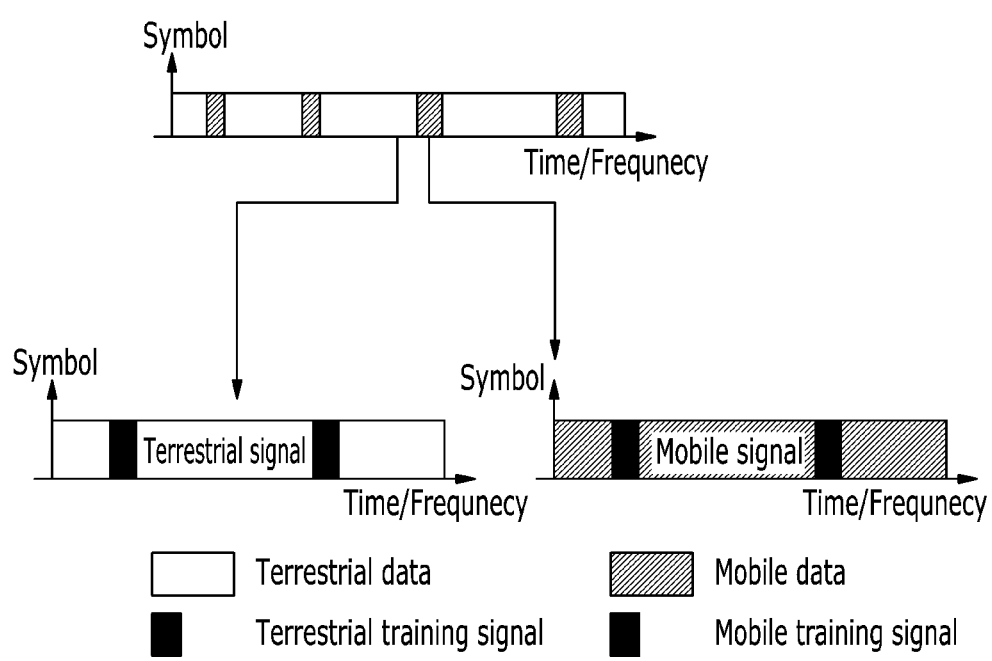
FIG. 3 is a block diagram illustrating a configuration of a multipath signal in a receiving apparatus of a coupled signal of a terrestrial signal and a mobile signal according to a first exemplary embodiment of the present invention.

FIG. 3 is a block diagram illustrating a configuration of a multipath signal in a receiving apparatus of a coupled signal of a terrestrial signal and a mobile signal according to a first exemplary embodiment of the present invention.

As shown in FIG. 3, a signal that is received through the antenna 10 is a multipath signal in which a terrestrial signal is coupled to the mobile signal, and a predetermined training signal is inserted into the mobile signal and the terrestrial signal.

The multipath signal selects a desired frequency by tuning of the tuner 20 and is converted to an intermediate frequency signal. The intermediate frequency signal is converted to a digital signal in the A/D converter 30, and the digital signal is demodulated through the demodulation unit 40.

The signal that is demodulated and output in the demodulation unit 40 is input to the equalization processor 50.

As shown in FIG. 2, the equalization processor 50 includes a channel estimation unit 52 and an adaptive filter 54.

The channel estimation unit 52 estimates a transmission channel of a mobile signal or a terrestrial signal through a training signal that is inserted into a data area of a received multipath signal, i.e., the mobile signal and the terrestrial signal that are coupled to the mobile signal, or estimates a transmission channel by detecting a received mobile signal and a transmitting signal corresponding to a terrestrial signal that is coupled to the mobile signal using a previously equalized signal through determined data.

The adaptive filter 54 receives an input of an estimation channel value that is estimated in the channel estimation unit 52, compensates distortion existing in mobile signal data and terrestrial signal data corresponding to the training signal, and outputs terrestrial and mobile data symbols.

As shown in FIGS. 1 and 2, a terrestrial symbol and a mobile symbol that are output from the equalization processor 50 via the above process are output to a terrestrial symbol and a mobile symbol, respectively, via a demultiplexer 60, and are output to a terrestrial bit stream and a mobile bit stream through a terrestrial decoder 72 and a mobile decoder 74, respectively.

In the foregoing description, by processing terrestrial and mobile symbols that are output from the equalization processor 50, a configuration and method that output a final terrestrial bit stream and a mobile bit stream may be performed by applying various apparatuses and methods in addition to the demultiplexer 60, the terrestrial decoder 72, and the mobile decoder 74, and the present invention is not limited to a method of processing and outputting a signal after the equalization processor 50.

Hereinafter, flow that performs equalization processing in a receiving apparatus of a coupled signal of a terrestrial signal and a mobile signal according to a first exemplary embodiment of the present invention will be described with reference to FIG. 4.

Figure 4:
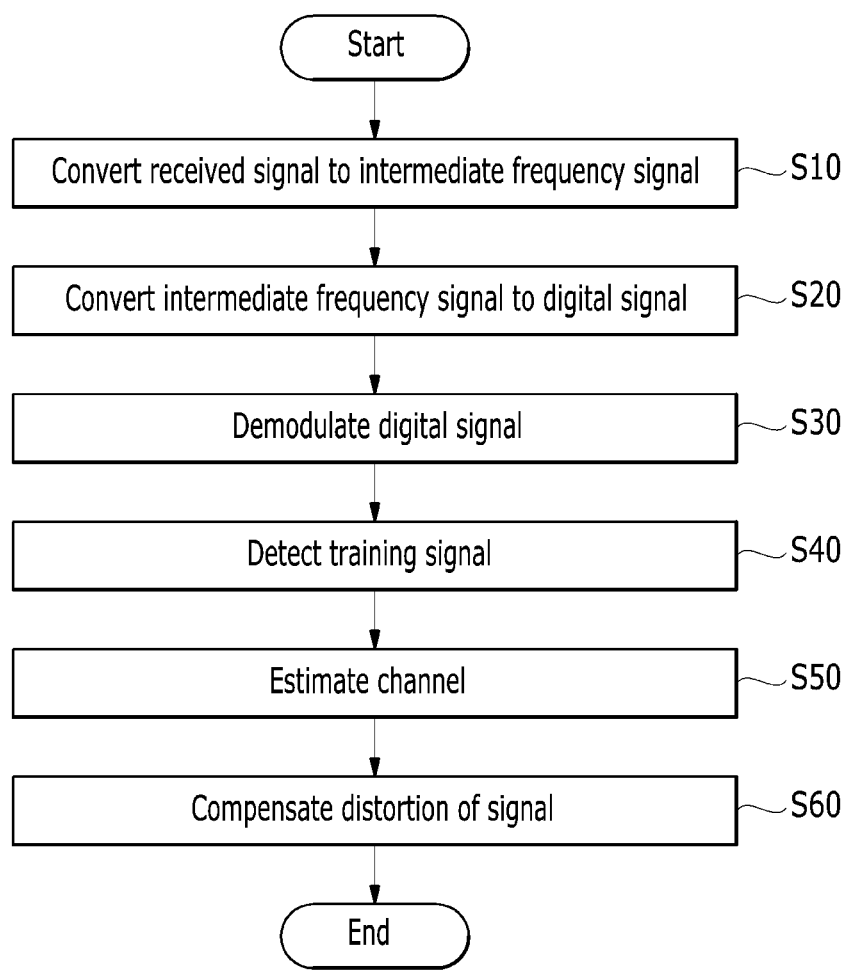
FIG. 4 is a flowchart illustrating flow of equalization processing in the apparatus for receiving a coupled signal of a terrestrial signal and a mobile signal according to a first exemplary embodiment of the present invention of FIG. 1.

FIG. 4 is a flowchart illustrating flow of equalization processing in the receiving apparatus of a coupled signal of a terrestrial signal and a mobile signal according to the first exemplary embodiment of the present invention of FIG. 1.

As shown in FIG. 4, in a method of receiving a coupled signal according to an exemplary embodiment of the present invention, the tuner 20 tunes a multipath signal that is received through the antenna 10 and converts the received signal to an intermediate frequency signal of a desired frequency (S10).

Thereafter, the A/D converter 30 converts the intermediate frequency signal to a digital signal (S20), and the demodulation unit 40 demodulates and outputs the converted digital signal (S30).

In the signal that is output from the demodulation unit 40, the equalization processor 50 detects a training signal that is inserted into a data area (S40), and a transmission channel of a mobile signal or a terrestrial signal that is coupled to the mobile signal and is transmitted with the mobile signal is estimated (S50). Thereafter, distortion existing within the mobile signal or the terrestrial signal that is coupled to the mobile signal and that is transmitted with the mobile signal is compensated using the channel estimation value (S60).

Hereinafter, an apparatus and method for receiving a coupled signal of a terrestrial signal and mobile signal according to a second exemplary embodiment of the present invention will be described.

Figure 5:
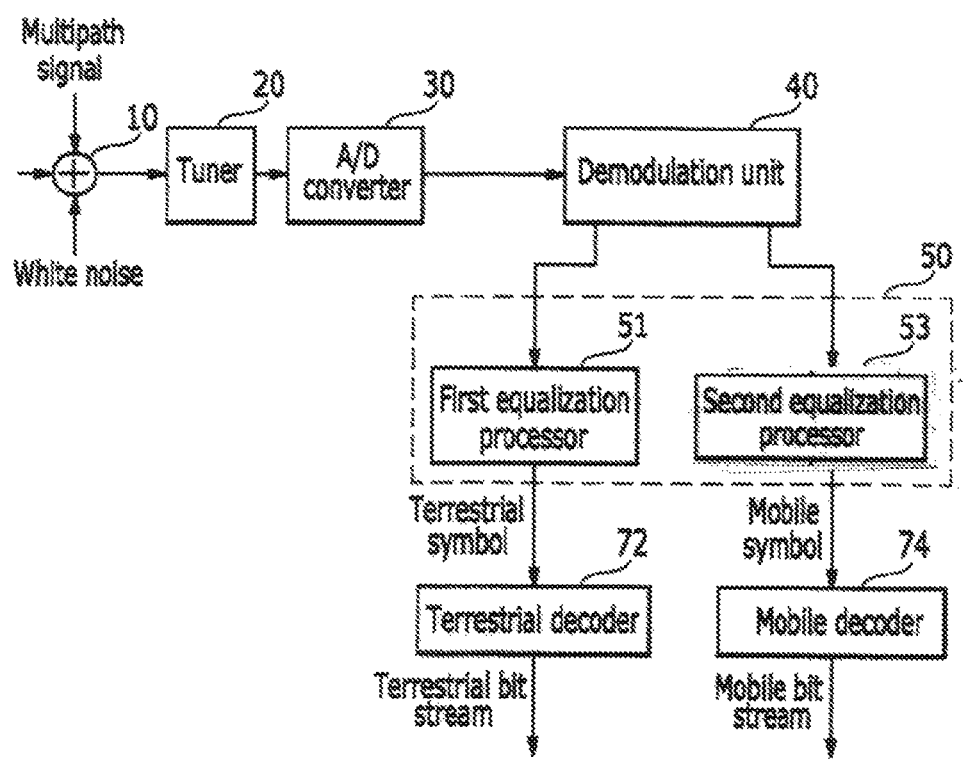
FIG. 5 is a block diagram illustrating a configuration of a receiving apparatus of a coupled signal of a terrestrial signal and a mobile signal according to a second exemplary embodiment of the present invention.
Figure 6:
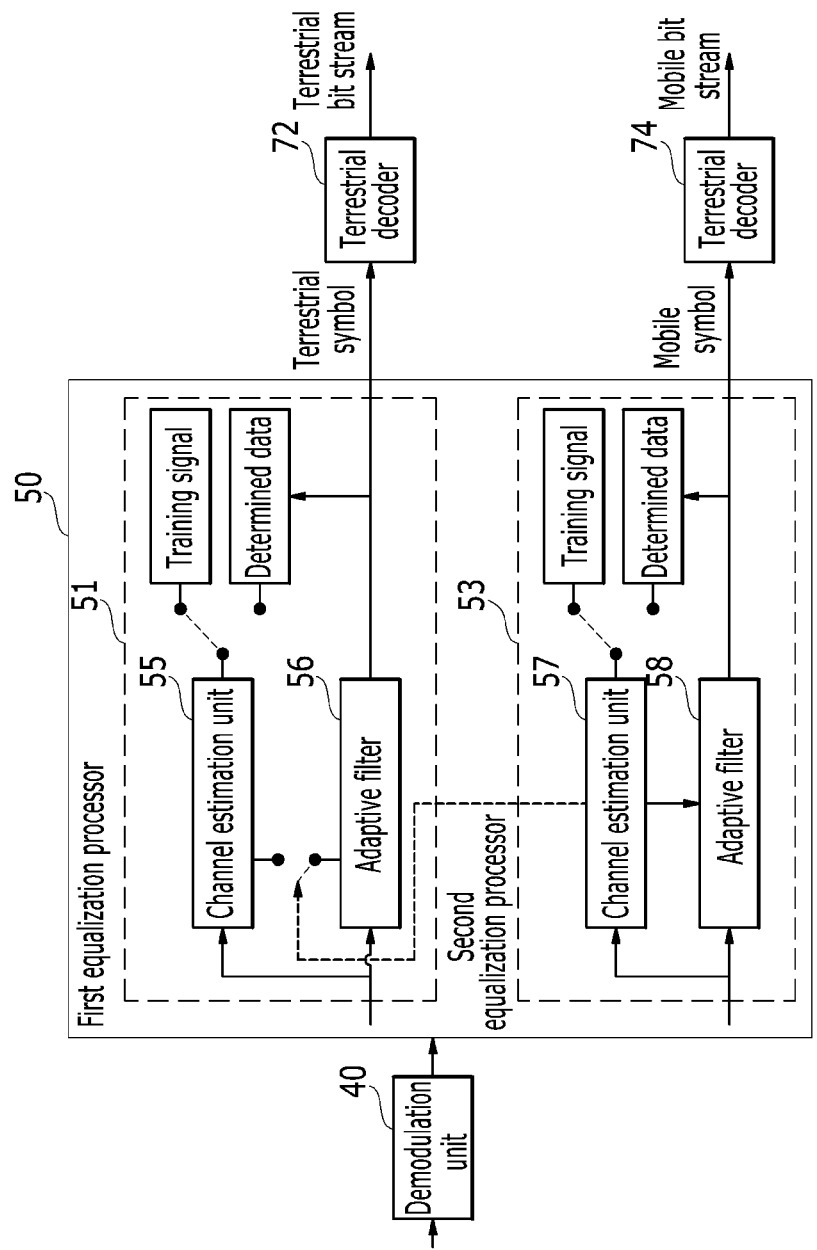
FIG. 6 is a block diagram illustrating a configuration of an equalization processor in a receiving apparatus of a coupled signal of a terrestrial signal and a mobile signal according to a second exemplary embodiment of the present invention.

FIG. 5 is a block diagram illustrating a configuration of a receiving apparatus of a coupled signal of a terrestrial signal and a mobile signal according to a second exemplary embodiment of the present invention. FIG. 6 is a block diagram illustrating a configuration of an equalization processor in a receiving apparatus of a coupled signal of a terrestrial signal and a mobile signal according to a second exemplary embodiment of the present invention.

As shown in FIGS. 5 and 6, the receiving apparatus of a coupled signal of a terrestrial signal and a mobile signal according to a second exemplary embodiment of the present invention includes an antenna 10, a tuner 20, an A/D converter 30, a demodulation unit 40, and an equalization processor 50, and the equalization processor 50 includes a first equalization processor 51 and a second equalization processor 53.

The first equalization processor 51 detects a training signal of a terrestrial signal from an output signal of the demodulation unit 40, estimates a transmission channel, and corrects distortion of terrestrial signal data.

The second equalization processor 53 detects a training signal of a mobile signal from an output signal of the demodulation unit 40, estimates a transmission channel, and corrects distortion of mobile signal data.

The first equalization processor 51 includes a channel estimation unit 55 that estimates a transmission channel of a terrestrial signal of an output signal of the demodulation unit 40, and an adaptive filter 56 that compensates distortion existing in terrestrial signal data using a channel estimation value of the channel estimation unit 55.

The channel estimation unit 55 estimates a transmission channel of a terrestrial signal through a training signal that is inserted into a data area of the terrestrial signal that is coupled to a mobile signal in a received multipath signal, or estimates a transmission channel by detecting a transmitting signal corresponding to a terrestrial signal that is coupled to the mobile signal using a previously equalized signal through determined data.

The adaptive filter 56 compensates distortion existing in the terrestrial signal data, and outputs a terrestrial data symbol using the channel estimation value and a channel estimation value that is input in a channel estimation unit 57 of the second equalization processor 53.

The second equalization processor 53 includes a channel estimation unit 57 that estimates a transmission channel of a mobile signal of an output signal of the demodulation unit 40 and an adaptive filter 58 that compensates distortion existing in mobile signal data using a channel estimation value of the channel estimation unit 57.

The channel estimation unit 57 estimates a transmission channel of a mobile signal through a training signal that is inserted into a data area of the mobile signal in a received multipath signal, or estimates a transmission channel by detecting a transmitting signal corresponding to the mobile signal using a previously equalized signal through determined data.

Further, in order to compensate distortion existing in terrestrial signal data of the first equalization processor 51, the channel estimation unit 57 transfers the channel estimation value to the first equalization processor 51.

The adaptive filter 58 compensates distortion existing in the mobile signal data and outputs a mobile data symbol using the channel estimation value.

Figure 7:
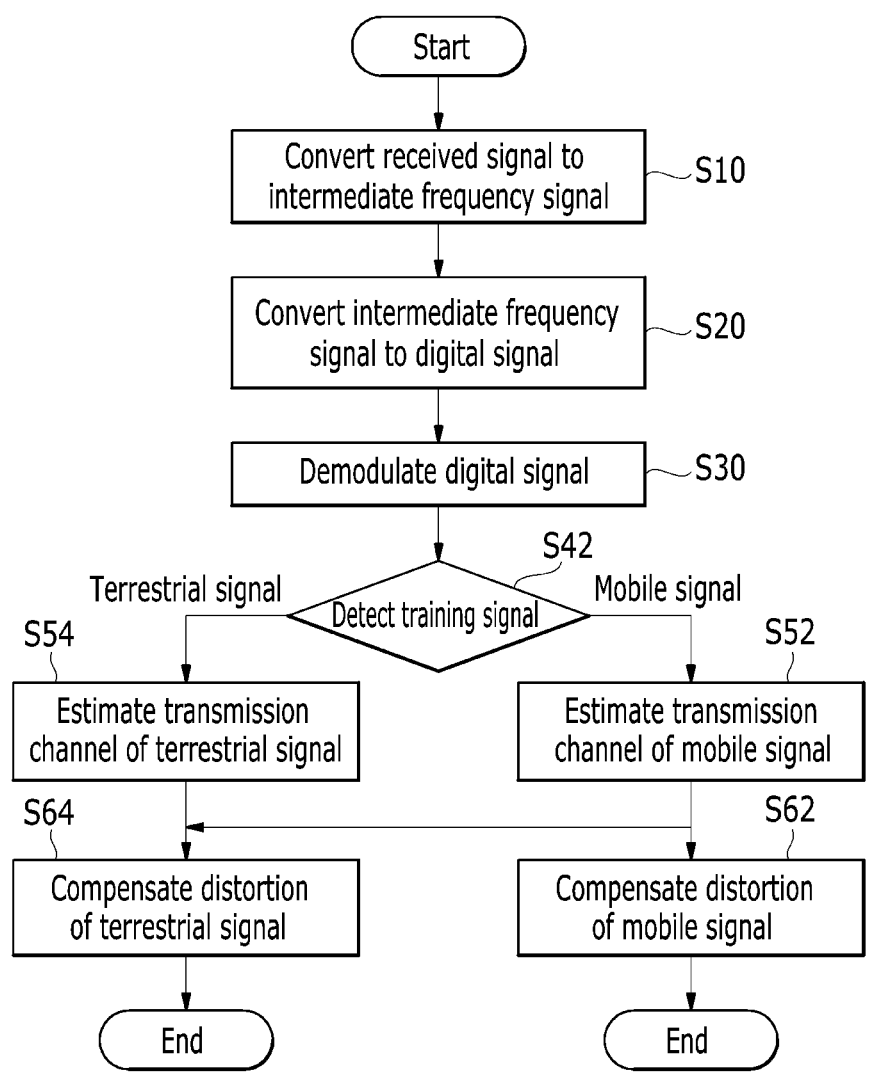
FIG. 7 is a flowchart illustrating flow of equalization processing in the receiving apparatus of a coupled signal of a terrestrial signal and a mobile signal according to a second exemplary embodiment of the present invention of FIG. 5.

FIG. 7 is a flowchart illustrating flow of equalization processing in a method of receiving a coupled signal of a terrestrial signal and a mobile signal according to a second exemplary embodiment of the present invention.

First, a received multipath signal is tuned in the tuner 20 and is converted to an intermediate frequency signal of a desired frequency (S10). Thereafter, the intermediate frequency signal is converted to a digital signal in the A/D converter 30 (S20), and the digital signal is demodulated in the demodulation unit 40 and is output (S30).

In a signal that is output from the demodulation unit (S30), a training signal that is inserted into a terrestrial signal data area is detected in the first equalization processor 51 (S42), and a transmission channel of a terrestrial signal is estimated (S54). Thereafter, distortion existing within the terrestrial signal is compensated using the channel estimation value (S64).

Further, in the signal that is output from the demodulation unit 40, a training signal that is inserted into a mobile signal data area is detected in the second equalization processor 53 (S42), and a transmission channel of the mobile signal is estimated (S52). Thereafter, distortion existing within the mobile signal using the channel estimation value is compensated (S62).

In the foregoing description, the channel estimation value of the mobile signal may be used as a reference value that corrects distortion of the terrestrial signal.

Hereinafter, an apparatus and method for receiving a coupled signal of a terrestrial signal and a mobile signal according to a third exemplary embodiment of the present invention will be described.

Figure 8:
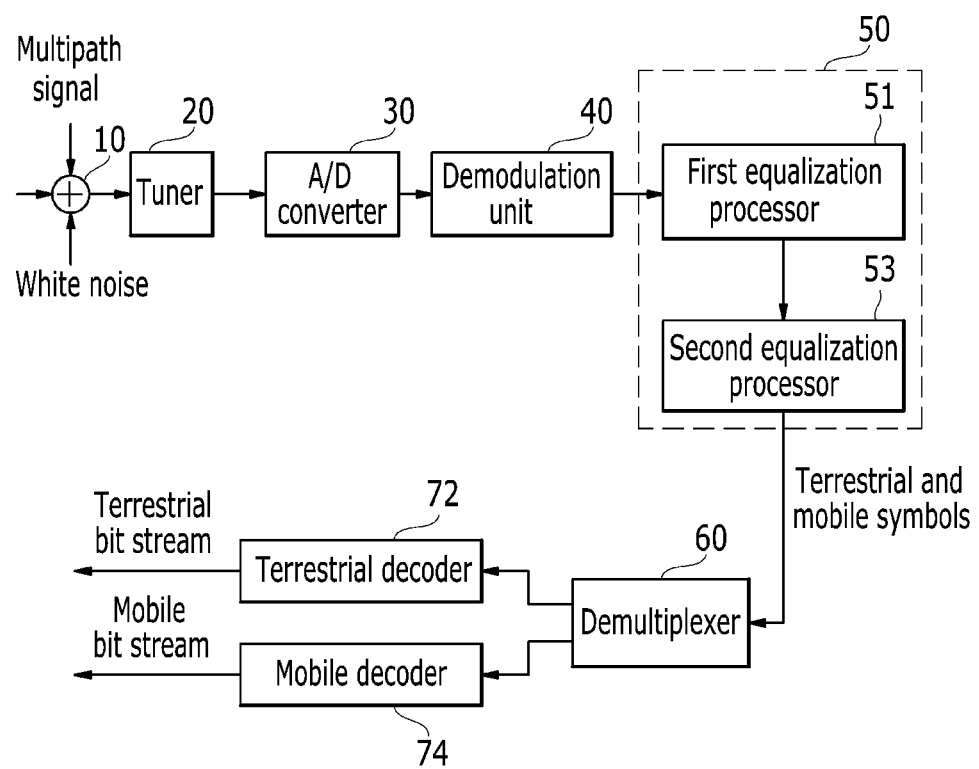
FIG. 8 is a block diagram illustrating a configuration of a receiving apparatus of a coupled signal of a terrestrial signal and a mobile signal according to a third exemplary embodiment of the present invention.
Figure 9:
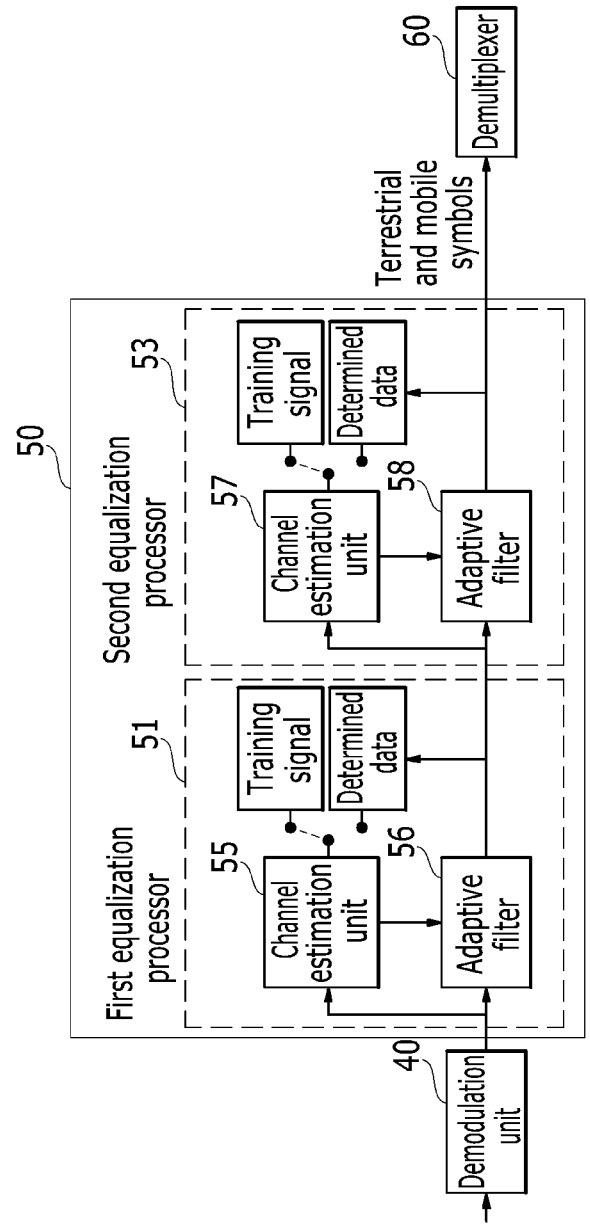
FIG. 9 is a block diagram illustrating a configuration of an equalization processor in a receiving apparatus of a coupled signal of a terrestrial signal and a mobile signal according to a third exemplary embodiment of the present invention.

FIG. 8 is a block diagram illustrating a configuration of a receiving apparatus of a coupled signal of a terrestrial signal and a mobile signal according to a third exemplary embodiment of the present invention. FIG. 9 is a block diagram illustrating a configuration of an equalization processor in a receiving apparatus of a coupled signal of a terrestrial signal and a mobile signal according to a third exemplary embodiment of the present invention.

As shown in FIGS. 8 and 9, the receiving apparatus of a coupled signal of a terrestrial signal and a mobile signal according to the third exemplary embodiment of the present invention includes an antenna 10, a tuner 20, an A/D converter 30, a demodulation unit 40, and an equalization processor 50, and the equalization processor 50 includes a first equalization processor 51 and a second equalization processor 53.

In the foregoing description, the first equalization processor 51 and the second equalization processor 53 are coupled in series.

The first equalization processor 51 estimates a transmission channel by detecting a training signal of a terrestrial signal from an output signal of the demodulation unit 40, and corrects distortion of terrestrial signal data.

The second equalization processor 53 estimates a transmission channel by detecting a training signal of a mobile signal from an output signal of the first equalization processor 51, and corrects distortion of mobile signal data.

The first equalization processor 51 includes a channel estimation unit 55 that estimates a transmission channel of a terrestrial signal of an output signal of the demodulation unit 40, and an adaptive filter 56 that compensates distortion existing in terrestrial signal data using a channel estimation value of the channel estimation unit 55.

The channel estimation unit 55 estimates a transmission channel of a terrestrial signal through a training signal that is inserted into a data area of the terrestrial signal that is coupled to a mobile signal in a received multipath signal, or estimates a transmission channel by detecting a transmitting signal corresponding to a terrestrial signal that is coupled to the mobile signal using a previously equalized signal through determined data.

The adaptive filter 56 outputs a signal that compensates distortion existing in terrestrial signal data in the multipath signal using the channel estimation value.

The second equalization processor 53 includes a channel estimation unit 57 that estimates a transmission channel of a mobile signal of an output signal of the first equalization processor 51, and an adaptive filter 58 that compensates distortion existing in mobile signal data using a channel estimation value of the channel estimation unit 57.

The channel estimation unit 55 estimates a transmission channel of a mobile signal through a training signal that is inserted into a data area of the mobile signal in an output signal of the first equalization processor 51, or estimates a transmission channel by detecting a transmitting signal corresponding to the mobile signal using a previously equalized signal through determined data.

The adaptive filter 58 compensates distortion existing in the mobile signal data using the channel estimation value, and outputs terrestrial and mobile data symbols.

Figure 10:
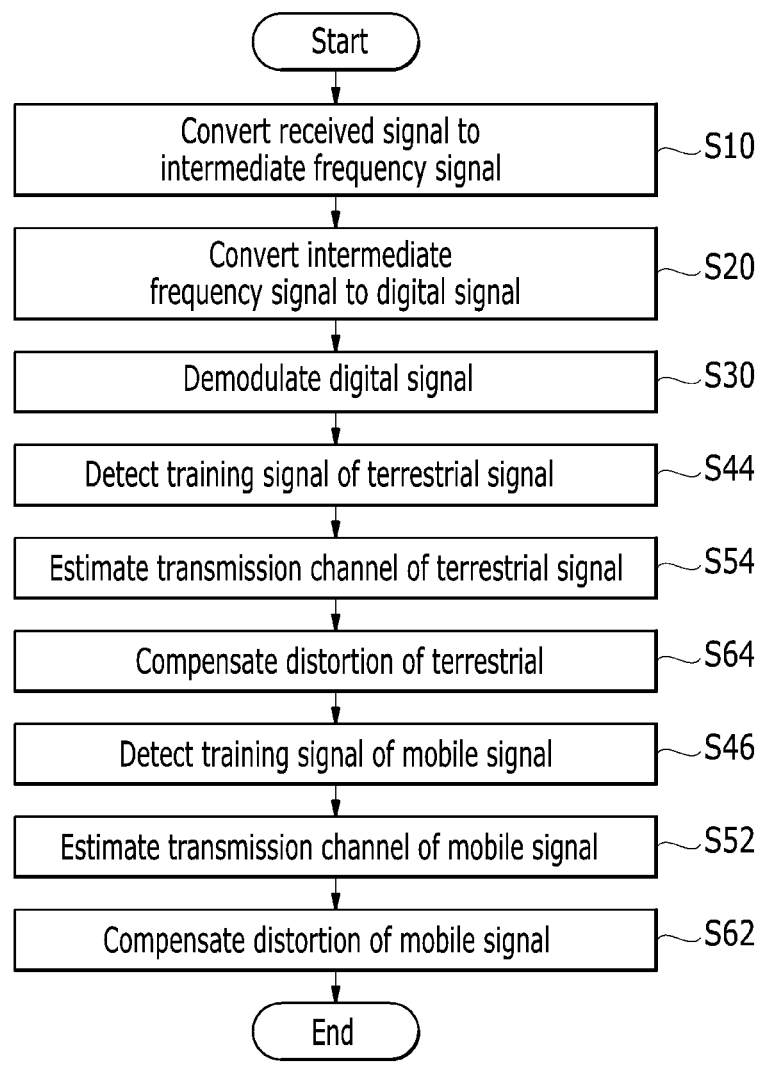
FIG. 10 is a flowchart illustrating flow of equalization processing in the receiving apparatus of a coupled signal of a terrestrial signal and a mobile signal according to a third exemplary embodiment of the present invention of FIG. 8.

FIG. 10 is a flowchart illustrating flow of equalization processing in a method of receiving a coupled signal of a terrestrial signal and a mobile signal according to a third exemplary embodiment of the present invention.

First, a received multipath signal is tuned in the tuner 20 and is converted to an intermediate frequency signal of a desired frequency (S10). Thereafter, the A/D converter 30 converts the intermediate frequency signal to a digital signal (S20), and the demodulation unit 40 demodulates and outputs the digital signal (S30).

In a signal that is output from the demodulation unit 40, a training signal that is inserted within a terrestrial signal data area is detected in the first equalization processor 51 (S44), and a transmission channel of the terrestrial signal is estimated (S54). Thereafter, distortion existing within the terrestrial signal is compensated using the channel estimation value (S64).

Thereafter, a signal in which distortion existing within the terrestrial signal is corrected is input to the second equalization processor 53, a training signal that is inserted into a mobile signal data area is detected (S46), and a transmission channel of the mobile signal is estimated (S52). Thereafter, distortion existing within the mobile signal is compensated using the channel estimation value (S62).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A receiving apparatus of a coupled signal of a terrestrial signal and a mobile signal, the receiving apparatus comprising:
    an antenna that receives the mobile signal and the terrestrial signal that are transmitted with one channel;
    a tuner that selects a desired frequency of the received signal by tuning and that converts the received signal to an intermediate frequency signal;
    an analog to digital converter (A/D converter) that converts the intermediate frequency signal that is converted in the tuner to a digital signal;
    a demodulator that demodulates and outputs the digital signal that is output from the A/D converter; and
    an equalization processor that estimates a transmission channel by detecting a training signal of the mobile signal and the terrestrial signal from an output signal of the demodulator and that compensates distortion existing in mobile signal data and terrestrial signal data;
    wherein the equalization processor comprises a first equalization processor that detects the training signal of the terrestrial signal from an output signal of the demodulator, estimates a transmission channel of the terrestrial signal through the training signal that is inserted into a data area of the terrestrial signal, and corrects distortion of terrestrial signal data, and
    a second equalization processor that detects the training signal of the mobile signal from an output signal of the demodulator or the first equalization processor, estimates a transmission channel of the mobile signal through the training signal that is inserted into a data area of the mobile signal, and corrects distortion of mobile signal data,
    wherein the first equalization processor comprises a first channel estimator that estimates a transmission channel of the terrestrial signal through the training signal that is inserted into a data area of the terrestrial signal from an output signal of the demodulator and that estimates a transmission channel by detecting a transmitting signal corresponding to a received terrestrial signal using a previously equalized signal through determined data and an adaptive filter that compensates distortion existing in the terrestrial signal data using a channel estimation value of the first channel estimator and a channel estimation value of a mobile signal that is input in the second equalization processor, and
    the second equalization processor comprises a second channel estimator that estimates a transmission channel of a mobile signal through the training signal that is inserted into a data area of the mobile signal from an output signal of the demodulator and that estimates a transmission channel by detecting a transmitting signal corresponding to a received mobile signal using a previously equalized signal through determined data, and that transfers the channel estimation value from the second channel estimator to the first equalization processor and an adaptive filter that compensates distortion existing in the mobile signal data using the channel estimation value from the second channel estimator.

2. A receiving apparatus of a coupled signal of a terrestrial signal and a mobile signal, the receiving apparatus comprising:
    an antenna that receives the mobile signal and the terrestrial signal that are transmitted with one channel;
    a tuner that selects a desired frequency of the received signal by tuning and that converts the received signal to an intermediate frequency signal;
    an analog to digital converter (A/D converter) that converts the intermediate frequency signal that is converted in the tuner to a digital signal;
    a demodulator that demodulates and outputs the digital signal that is output from the A/D converter; and
    an equalization processor that estimates a transmission channel by detecting a training signal of the mobile signal and the terrestrial signal from an output signal of the demodulator and that compensates distortion existing in mobile signal data and terrestrial signal data;
    wherein the equalization processor comprises a first equalization processor that detects the training signal of the terrestrial signal from an output signal of the demodulator, estimates a transmission channel of the terrestrial signal through the training signal that is inserted into a data area of the terrestrial signal, and corrects distortion of terrestrial signal data, and
    a second equalization processor that detects the training signal of the mobile signal from an output signal of the demodulator or the first equalization processor, estimates a transmission channel of the mobile signal through the training signal that is inserted into a data area of the mobile signal, and corrects distortion of mobile signal data,
    wherein the first equalization processor comprises a first channel estimator that estimates a transmission channel of the terrestrial signal through the training signal that is inserted into a data area of the terrestrial signal in an output signal of the demodulator and that estimates a transmission channel by detecting a transmitting signal corresponding to a received terrestrial signal using a previously equalized signal through determined data and an adaptive filter that receives an input of a channel estimation value of the first channel estimator and that compensates distortion existing in the terrestrial signal data, and
    the second equalization processor comprises a second channel estimator that estimates a transmission channel of a mobile signal through the training signal that is inserted into a data area of the mobile signal from a signal that is output from the first equalization processor and that estimates a transmission channel by detecting a transmitting signal corresponding to the received terrestrial signal using a previously equalized signal through determined data, and an adaptive filter that receives an input of a channel estimation value of the second channel estimator and that compensates distortion existing in the mobile signal data.

3. A method of receiving a coupled signal of a terrestrial signal and a mobile signal, the method comprising:

selecting a desired frequency of the mobile signal and the terrestrial signal that are received with one channel by tuning of a tuner and converting the received signal to an intermediate frequency signal;

converting, by an A/D converter, the intermediate frequency signal to a digital signal;

demodulating the digital signal through a demodulator;

estimating, by a channel estimator of an equalization processor, a transmission channel of the mobile signal and the terrestrial signal through a training signal that is inserted into a data area of the mobile signal and the terrestrial signal that is coupled to the mobile signal, and estimating a transmission channel by detecting a received mobile signal using a previously equalized signal through determined data and a transmitting signal corresponding to a terrestrial signal that is coupled to the mobile signal;

receiving an input of the channel estimation value and compensating distortion existing in mobile signal data and terrestrial signal data corresponding to the training signal through an adaptive filter of an equalization processor;

and after the demodulating of the digital signal, receiving an input of the demodulation signal through a first channel estimator of the first equalization processor, estimating a transmission channel of the terrestrial signal through a training signal that is inserted into a data area of the terrestrial signal, and estimating a transmission channel by detecting a transmitting signal corresponding to a received terrestrial signal using a previously equalized signal through determined data;

receiving an input of the channel estimation value and a channel estimation value of the second equalization processor and compensating distortion existing in the terrestrial signal data through an adaptive filter of the first equalization processor;

receiving an input of the demodulation signal through the second channel estimator of the second equalization processor, estimating a transmission channel of the mobile signal through the training signal that is inserted into a data area of the mobile signal, and estimating a transmission channel by detecting a transmitting signal corresponding to a received mobile signal using a previously equalized signal through determined data;

and receiving an input of the channel estimation value and compensating distortion existing in the mobile signal data through an adaptive filter of the second equalization processor.

4. A method of receiving a coupled signal of a terrestrial signal and a mobile signal, the method comprising:

selecting a desired frequency of the mobile signal and the terrestrial signal that are received with one channel by tuning of a tuner and converting the received signal to an intermediate frequency signal;

converting, by an A/D converter, the intermediate frequency signal to a digital signal;

demodulating the digital signal through a demodulator;

estimating, by a channel estimator of an equalization processor, a transmission channel of the mobile signal and the terrestrial signal through a training signal that is inserted into a data area of the mobile signal and the terrestrial signal that is coupled to the mobile signal, and estimating a transmission channel by detecting a received mobile signal using a previously equalized signal through determined data and a transmitting signal corresponding to a terrestrial signal that is coupled to the mobile signal;

receiving an input of the channel estimation value and compensating distortion existing in mobile signal data and terrestrial signal data corresponding to the training signal through an adaptive filter of an equalization processor; and after the demodulating of the digital signal, receiving an input of the demodulated digital signal through a first channel estimator of the first equalization processor, estimating a transmission channel of the terrestrial signal through a training signal that is inserted into a data area of the terrestrial signal, and estimating a transmission channel by detecting a transmitting signal corresponding to a received terrestrial signal using a previously equalized signal through determined data;

receiving an input of the channel estimation value and compensating distortion existing in the terrestrial signal data through an adaptive filter of the first equalization processor;

receiving an input of a signal that compensates distortion existing in the terrestrial signal data through the second channel estimator of the second equalization processor, estimating a transmission channel of the mobile signal through a training signal that is inserted into a data area of the mobile signal, and estimating a transmission channel by detecting a transmitting signal corresponding to a received mobile signal using a previously equalized signal through determined data; and receiving an input of the channel estimation value and compensating distortion existing in the mobile signal data through an adaptive filter of the second equalization processor.

* * * * *